March 5, 1935.   C. T. GODWIN   1,993,272
STEREOSCOPIC VIEWING LENS
Filed Dec. 9, 1931
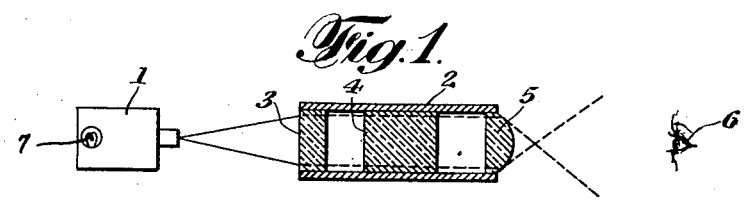
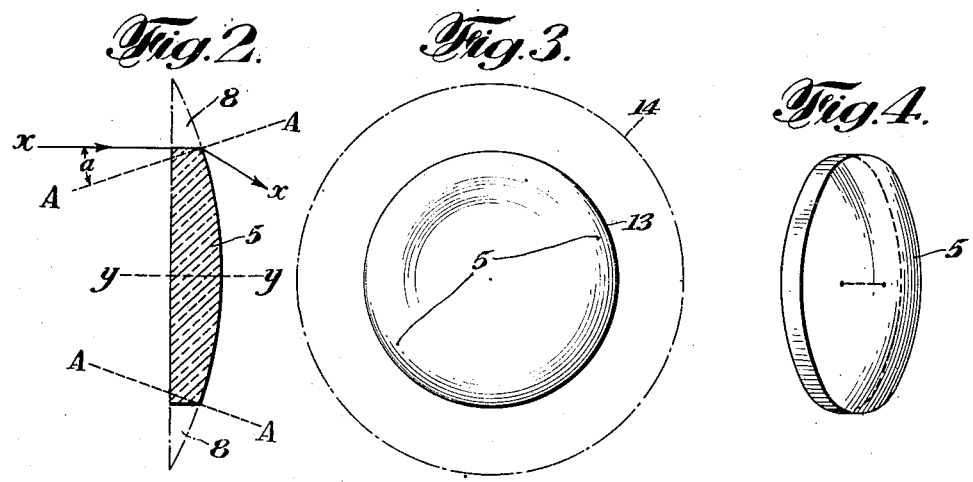
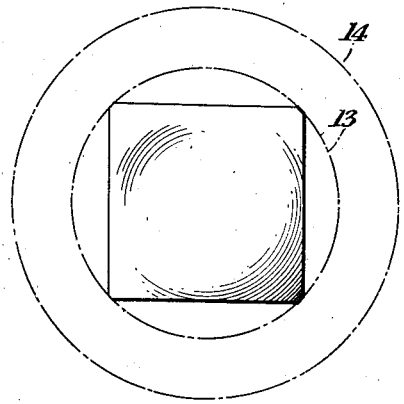
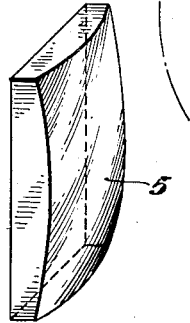
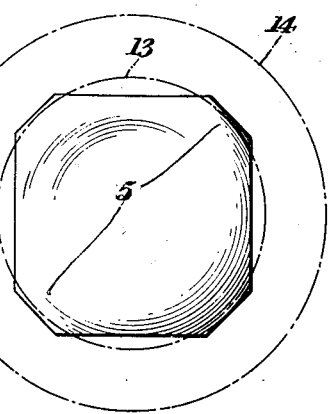
INVENTOR
Charles T. Godwin
BY
ATTORNEYS Patented Mar. 5, 1935

1,993,272

UNITED STATES PATENT OFFICE 1,993,272

STEREOSCOPIC VIEWING LENS

Charles T. Godwin, Yonkers, N. Y., assignor to New Screen Corporation, New York, N. Y., a corporation of New York Application December 9, 1931, Serial No. 579,841

6 Claims. (Cl. 88—29)

This invention relates to lenses and more particularly lenses suitable for use and application as stereoscopic viewing lenses, in accordance with the invention disclosed and claimed in my co-pending application Serial No. 571,330 filed October 27, 1931 entitled "Apparatus for viewing projected pictures" and in co-pending application Serial No. 579,840 filed December 9, 1931, entitled "Apparatus for viewing pictures and the like".

One of the objects of the present invention is to provide an improved stereoscopic viewing lens for use in each type of apparatus disclosed in the above identified co-pending applications.

Another object is to provide a stereoscopic lens element substantially free from deleterious internal light reflections.

Other objects and advantages will be apparent as the invention is more fully disclosed.

In accordance with the objects of the present invention I have designed a lens for the stereoscopic viewing of pictures in which the deleterious effects of interiorly reflected light radiation is substantially eliminated.

Before further disclosing the nature and scope of the present invention reference should be made to the accompanying drawing wherein:

Fig. 1 illustrates the elements comprising the projected picture viewing apparatus of my co-pending application, Serial No. 571,330 above identified;

Fig. 2 is a sectional view of the viewing lens in the apparatus of Fig. 1;

Fig. 3 is a plan view of the same;

Fig. 4 is a perspective view of the same;

Fig. 5 is a plan view of a modification of the lens;

Fig. 6 is a perspective view of the modification shown in Fig. 5; and

Fig. 7 is a plan view of a second modification of the lens element of the present invention.

Referring to Fig. 1, the apparatus disclosed therein comprises a picture projection apparatus including a light source 7 and a picture viewing apparatus 2 including a casing identified by numeral 2, a translucent screen 3, a light intensity reducing element 4 and a stereoscopic lens 5. The eye 6 of an observer views a phantom image of the picture projected from apparatus 1 and received on screen 3, through the stereoscopic lens 5. The phantom image is created in screen 3 in a manner substantially as disclosed and claimed in co-pending application Serial No. 571,330 above identified.

Briefly, the method of obtaining the phantom image in screen 3 consists in projecting a beam of light from source 7 of projection machine 1 through the film (not shown). The resultant beam comprises variations in light intensities caused by the variations in the lights and shadows comprising the picture. This beam is intercepted by the translucent screen element 3 having a degree of translucency less than that required to form a shadow image therein, and the intensity of the radiation is reduced by refracting element 4 to an observable degree. The phantom image thus obtained is viewed directly through the stereoscopic lens 5. In this manner all the depth and reality of the picture is preserved and reproduced by the observer's eye.

I have found, however, that due to the fact that the light radiation is so intense in each type of apparatus in my co-pending applications that means must be provided to reduce the internal light reflecting properties of the lens 5 so that deleterious results therefrom are not experienced. This I obtain by comprising the lens of that section of a spherical lens lying within what may be termed its unaberrated area. The unaberrated area of a spherical lens lies within the circumference of a circle 13 generated by the revolution of the incidence normal A—A of a limiting incidence ray X—X about the center axis Y—Y of the lens 5. The limiting incidence ray X—X is that ray which strikes the inner surface of the curved lens face at an angle (a) greater than the critical angle of incidence for the specific material comprising the lens 5. This critical angle varies with the composition of the lens material, and the diameter of circle 13 with any given lens composition will vary with the degree of curvature of the lens.

Within the area enclosed by circle 13 the light radiation is transmitted through the lens 5 with a minimum of reflection. In the area lying between circle 13 and the edge 14 of the spherical lens 5 the light radiation is in major part reflected, and the angle of reflection is such that the reflected light traverses the lens 5 in a direction transverse to the center axis Y—Y. This reflected light is detrimental to the viewing of pictures by the method and apparatus disclosed in my above identified co-pending applications.

In relatively thin lenses this aberration is not marked but where thick lenses are used as contemplated in my apparatus for viewing pictures and where relatively strong light intensities are projected or reflected through the lens, the aberration caused by internally reflected light radiation is quite apparent.

Accordingly, and to overcome this detrimental effect, the lens element 5 of the present invention is comprised of that portion of the spherical lens 14 lying within the unaberrated section enclosed by circle 13. Lens 5 may be circular as shown in Fig. 4, or may be square as in Fig. 6, or may be rectangular if desired, or may be many sided as indicated in Fig. 7.

Having with particularity broadly and specifically disclosed the present invention it is apparent that the unaberrated lens of the present invention is subject to many modifications and adaptations without departing essentially from the nature and scope of the same as may be included within the following claims.

What I claim is:

1. In apparatus for viewing pictures a plano-convex stereoscopic lens through which the picture is observed, the said lens being comprised of that center section of a spherical lens which lies substantially within the unaberrated area thereof.

2. In apparatus for viewing pictures a plano-convex stereoscopic lens element through which the picture is observed, said lens being comprised substantially of that central portion of the lens lying within the circumference of a circle generated by the revolution of the incidence normal of a limiting incidence ray about the center transverse axis of the lens.

3. In apparatus for viewing pictures including a plano-convex stereoscopic lens element through which the picture is viewed, means to restrict the viewing area thereof to that central portion substantially included within the circumference of a circle generated by the revolution of the incidence normal of a limiting incidence ray about the center transverse axis of the lens.

4. In combination, picture viewing apparatus including an illuminated picture to be viewed and a plano-convex stereoscopic viewing lens, of the type defined and claimed in claim 6.

5. In combination, apparatus including means to project a picture and apparatus for viewing the same including means to fix a phantom image of the picture upon a translucent screen means to reduce the light intensities of said image to a viewable degree and a plano-convex stereoscopic lens to view the image, said lens being of the type defined and claimed in claim 6.

6. A lens element adapted for use in the stereoscopic viewing of pictures, comprised of that center section of a plano-convex lens which lies substantially included within the circumference of a circle generated by the revolution of the incidence normal of a limiting incidence ray about the center transverse axis of the lens.

CHARLES T. GODWIN.